METHOD FOR COATING SEMICONDUCTORS AND APPARATUS

Filed Aug. 2, 1965

Inventors:
Herbert Ehinger
Wolfgang Pikorz
By: Spencer & Kaye
Attorneys 3,473,959
METHOD FOR COATING SEMICONDUCTORS AND APPARATUS Herbert Ehinger and Wolfgang Pikorz, Belecke (Mohne), Germany, assignors to Licentia Patent-Verwaltungs-G.m.b.H., Frankfurt am Main, Germany Filed Aug. 2, 1965, Ser. No. 476,442
Claims priority, application Germany, Aug. 10, 1964, L 48,503
Int. Cl. H01b *1/04*
U.S. Cl. 117—201 12 Claims

ABSTRACT OF THE DISCLOSURE

Method for coating the surface of a semiconductor element with a protective film wherein an etched semiconductor element is placed into a vessel which is evacuated. A gaseous mixture of a carrier gas and a silicon compound is then introduced into such vessel and the pressure of such mixture is adjusted to between about 0.1 and 2 torr. A protective film is deposited on the surface of such element by passage of a voltage of between about 400 and 1500 volts through such mixture, resulting in deposition of such film on the surface of such element by gaseous discharge.

The present invention relates to a method and apparatus for coating the surface of semiconductors with a protective film.

Electrical elements, as, for example, semiconductors made of silicon and germanium, are etched subsequent to their manufacture, in order to obtain their full reverse characteristics by eliminating interfering surface effects. Unfortunately, however, the electrical element does not retain this favorable characteristic, instead, the characteristic deteriorates when the element comes into contact with the atmosphere as a result of chemical sorption at the semiconductor surface. It is, therefore customary to coat this surface with a protective film, for example, by applying a silicon lacquer, by brushing on a silicon rubber, or by thermally or anodically oxidizing the semiconductor surface. Additionally, the elements have to be protected from the adverse influence of the atmosphere by being encapsulated in hermetically sealed containers.

One factor which has an especially deleterious influence on the element is the humidity, for example, water vapor, which is always present in the air. That is so can readily be ascertained simply by breathing onto an unprotected rectifier while observing its reverse characteristic which, it will be noted, changes, this change usually being an irreversible change.

It is also known to precipitate monocrystalline silicon epitaxially, at high temperatures, from silicon compounds, for example, silane. In contrast to this last mentioned process it is the object of the present invention to provide a method and an apparatus for coating the surface of a semiconductor with a thick amorphous protective layer, which does not consist of pure silicon and which can be formed at low temperatures.

The present invention also resides in an apparatus for carrying out this method.

More particularly, the present invention resides in coating the surface of a semiconductor, especially a germanium or silicon semiconductor, by applying the protective film by means of a gaseous discharge, this being carried out in an atmosphere containing a silicon compound, in the presence of a carrier gas.

The process according to the invention is carried out as follows. The elements to be treated, for example, silicon diodes or thyristors whose pn-junctions are formed by alloying, by diffusing, or epitaxially, after having been etched, are laid onto the cathodes of a discharge vessel.

In order to avoid contamination, the cathodes consist of silicon which can, for example, be melted into a glass having a suitable coefficient of expansion. The glass sold commercially in West Germany and bearing the trademark "Duranglas 50" has been found suitable for this purpose. Alternatively, the silicon may be cemented onto a glass disc. A large number of elements may be laid on any one cathode, and there may be a number of cathodes within any given discharge vessel. Only a single anode is needed in each discharge vessel, which anode—again for purposes of avoiding contamination—consists of silicon and may, for example, be fused to glass. The vessel itself is advantageously made of quartz or glass. The vessel is evacuated, for example by means of a rotary oil pump, while a carrier gas, for example $N_2$ or $O_2$, mixed with silane vapor, flows into the discharge vessel via a needle valve. The needle valve is so adjusted that the pressure within the vessel is between 0.1 and 2 torr. The carrier gas may readily be mixed with the silane vapor by causing the gas to flow over a quantity of liquid silane compound before the gas passes into the discharge vessel by way of the needle valve. Should the vapor pressure of the silane not be high enough in order to form a protective film sufficiently rapidly, the reservoir may be heated, for example, by means of a water bath.

The substances forming the protective film are silanes, silanols, siloxanes or silicic acid esters, singly or in mixtures. Experience has shown that organic silicon compounds such as halogen substituted alkyl silanes, aryl silanes, or alkyl aryl silanes as well as alkyl and/or aryl esters of silicic acid have been found to be particularly suitable. Specific examples are monochlorotrimethyl silane, dichloromethyl silane, trichloromethyl silane, silicic acid ethyl ester, taken singly or in mixture.

After the desired pressure has been made to prevail within the discharge vessel, a voltage of between about 400 and 1500 volts is applied across the electrodes, thereby to ignite a gaseous discharge. Depending on the prevailing pressure conditions, the discharge will be a spark or glow discharge. In the case of spark discharge, one to two discharges will suffice in order to produce a film on the surface of the silicon which is visible by its interference colors. In the case of glow discharges, the treating time for producing the protective film will be between about 20 seconds to 15 minutes. The current densities are in the range of between 0.1 to 10 milliamperes per square centimeter in the case of glow discharge, while in the case of spark discharges, the current densities are greater by a factor of approximately 10. The protective film is amorphous, as proved by electron interference, and of uniform interference color. Depending on the duration of the treating time, and other conditions of the process, the thickness of the film is of the order of several hundred to several thousand A.

After the discharge, the elements are preferably heated, for example in air at a temperature of about 150° C. for approximately ten minutes, or in nitrogen at about 270° C. for approximately fifteen minutes. After this heating, the reverse characteristic exhibits low reverse currents up to high reverse voltages, that is to say, the characteristics will not "droop." The thus-treated semiconductors are insensitive to being breathed on or to being grasped by hand. These excellent characteristics are maintained, without further protective measures being taken, when the semiconductors are stored open, i.e., when they are exposed to air, particularly when they are exposed to warm air. On the other hand, identical semiconductors which have not been treated in accordance with the present invention, i.e., semiconductors which have been subjected only to the final etching step, were found not to have the stable characteristics which semiconductors treated in accordance with the present invention were found to have.

After the semiconductor elements have been treated in the manner described above, they may, without being subjected to any further protective steps, be cast in resin or be built into housings.

Additional objects and advantages of the present invention will become apparent upon consideration of the following description when taken in conjunction with the accompanying drawings in which.

Figures 1, 2, 3:
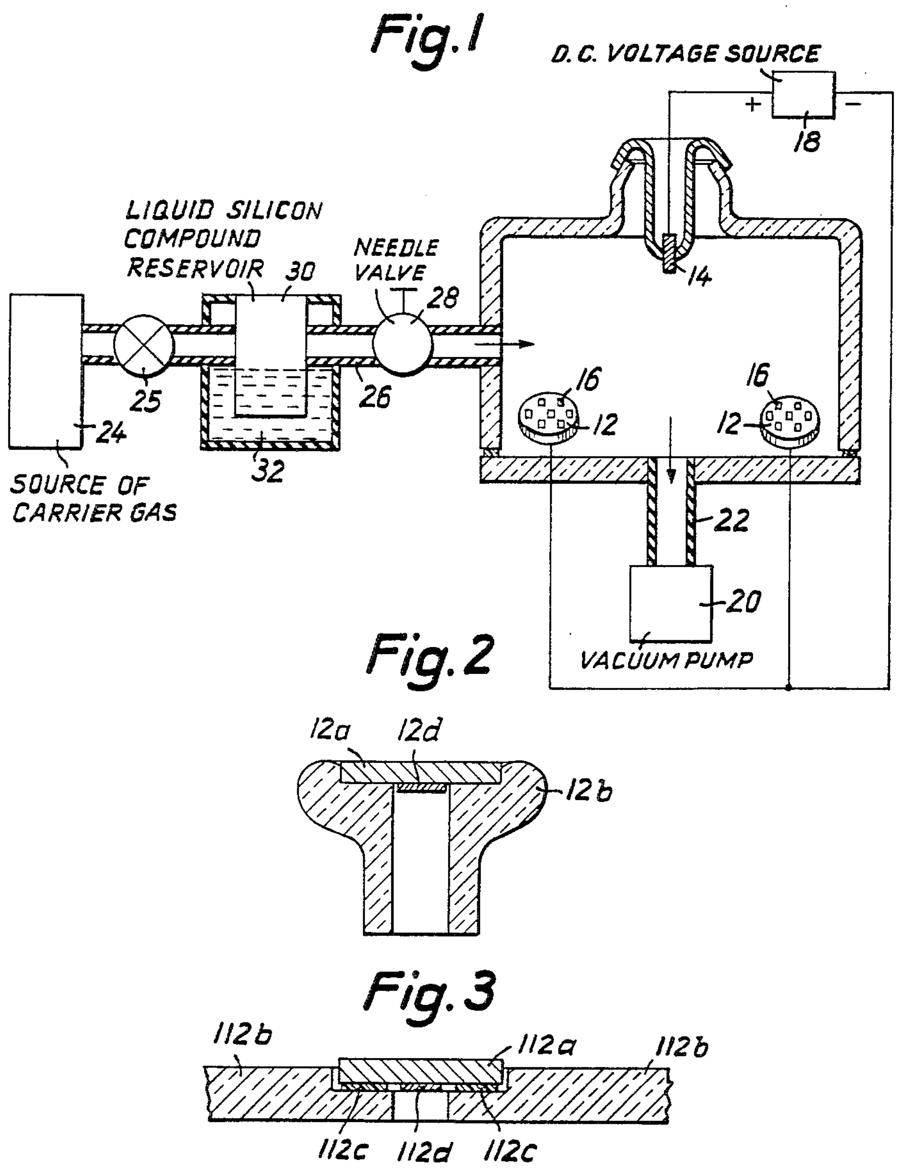
FIGURE 1 is a schematic illustration, partly in section, of an apparatus by means of which the process according to the present invention may be carried out.
FIGURE 2 is a sectional view showing one embodiment of a cathode forming part of an apparatus according to the present invention.
FIGURE 3 is a sectional view showing another embodiment of a cathode forming part of an apparatus according to the present invention.

Referring now to the drawing and first to FIGURE 1 thereof, the same shows a gas discharge vessel 10 within which are arranged electrodes, including a plurality of silicon cathodes 12 and a silicon anode 14. Each cathode 12 is configured to form a support surface on which may lie a number of semiconductor elements 16 to be treated in accordance with the present invention. The anode and cathodes are connected across a source of direct current voltage 18 which can be varied so as to apply the desired potential.

The interior of the gas discharge vessel 10 is in communication with a vacuum pump 20 via a conduit 22, as well as with a source of the carrier gas 24, e.g. oxygen or nitrogen, via a conduit 26, the latter having in its path a needle valve 28 and a reservoir 30 of the liquid silicon compound, e.g. silane, and a valve 25. Also shown is a hot water bath 32 for keeping the reservoir 30 at the desired temperature.

As shown in FIGURE 2, the silicon cathode may comprise a silicon mass **12*a* fused into a glass disc 12*b*, or, as shown in FIGURE 3, the silicon mass 112*a* may be cemented to the glass disc 112*b* with a layer of cement 112*c*. In both cases the contact area on the back of the silicon cathode is painted with a conducting paste, e.g. silver paint, to make a good electrical contact with the voltage source by means of the silicon rod fused through the glass wall of the vessel 10. For the construction of FIGURE 3 it is also practicable to make the bottom of the vessel 10 by metal. The glass disc 112*b***, which touches the glass side walls of the vessel, is put on said metal bottom. The electrical connections with the voltage source is made by a wire fed through a glass-metal seal in the metal bottom.

The discharge vessel may contain any desired number of cathodes, and the support surface of each of these cathodes will be large enough to carry the requisite number of elements to be treated.

It will thus be seen that, in accordance with the present invention, there is provided a way of treating, and particularly finishing, semiconductor elements which are insensitive to humidity, and can withstand, for example, human breath. Furthermore, the semiconductor surface can be touched by hand, there being no danger that this will adversely affect the characteristics of the semiconductor element. This, is will be appreciated, greatly facilitates further handling of the elements. Moreover, the protective film resists most acids and solvents as well as their vapors, except hydrofluoric acid, and is readily able to withstand the normal operating temperatures for rectifiers, these being up to about 200° C. Indeed, experiments have shown that semiconductor elements treated in accordance with the present invention can be exposed to temperatures as high as 270° C. without damage.

The process according to the present invention further has the advantage over processes wherein lacquers, pastes or the like are applied to the surface, that a large number of elements, for example, several hundred elements, can readily be treated simultaneously.

The present invention is also advantageous over conventional thermal or anodic oxidation processes in that the method according to the present invention is simpler to carry out than heretofore known processes. Also, the semiconductor elements are treated gentler than in the case of heretofore known processes, in that, in accordance with the present invention, the semiconductor elements are not exposed to excessively high temperatures.

Yet another advantage of the process according to the present invention is that it does not entail immersing the semiconductor elements into more or less aggressive liquids which themselves are not readily available in the very high degree of putity normally required.

It will be understood that the above description of the present invention is susceptible to various modifications, changes, and adaptations, and the same are intended to be comprehended within the meaning and range of equivalents of the appended claims.

The following examples demonstrate the use of the present invention:

(I)

Phosphorus and boron was diffused (respectively 35 and 60$\mu$ deep) into n-type silicon slices (80 ohm-cm., 280$\mu$ thick) by known techniques. The surfaces were nickelplated by electrolysis and galvanized by gold. By a diamond wheel the slices were divided into square diodes with bevelled edges. The edge of each square diode was 5 mm. long, the bevel made an angle of 60° with the surface. The diodes were etched in a mixture of two parts by volume fuming nitric acid, three parts hydrofluoric acid, five parts glacial acetic, washed by deionised water and dried in air in a furnace at 150° C.

Twelve diodes were put on one silicon cathode (25 mm. diameter). The gas discharge vessel contained six cathodes cemented into one glass disc. The cathodes were connected together below the glass disc by brass stripes. So they had the same potential.

The air was pumped out of the gas discharge vessel by a rotary oil pump. The needle valve was fullly opened and the gas discharge vessel purged by nitrogen and the vapor of silicic acid ethyl ester. By closing the needle valve a pressure of 0.5 mm. Hg was adjusted. A voltage of 1000 volts between the anode and the cathodes (distance between anode and each of the six cathodes 8 cm.) ignited the gas discharge. Then a voltage of 500 volts between anode and cathode was adjusted. The total current was 1 ma. with a resistance of 10,000 ohms between the vessel and the voltage source.

The coating film reached a thickness of about 1000 A. in 30 seconds. After this time the needle valve and the valve between the container of carrier gas (nitrogen) and the reservoir of liquid silicic acid ethyl ester were closed. The reservoir was heated during the gas discharge to 80° C. by warm water. The gas discharge vessel was flooded by air and opened.

The 72 diodes were annealed at 150° C. in air in a furnace during 15 minutes.

After this treatment the characteristics of the diodes did not change by breathing. The blocking voltage was the same as after the etching step (about 1700 volts).

(II)

Alloyed silicon diodes (base p-type 2000 ohm-cm., 3 mm. diameter, 250$\mu$ thick) on molybdenum base plate (4 mm. diameter, 0.5 mm. thick) were passivated in glow discharge of dichlorodimethyl silane vapor in nitrogen as carrier gas in the following manner: After the alloying process in hydrogen on the bottom with a Al-Si-eutectic foil (50$\mu$ thick, 3 mm. diameter), on top with a gold-antimony foil (80$\mu$ thick 1.5 mm. diameter) the diodes were etched in a mixture of one part concentrated nitric acid and one part hydrofluoric acid during 15 seconds, washed by deionised water and dried in a furnace (air, 100° C.).

Eight diodes were put on the silicon cathode of the gas discharge vessel. In this vessel the distance between anode and cathode was 7 cm. After evacuating the vessel by a rotary oil pump, the needle valve was fully opened and a stream of nitrogen as carrier gas and dichlorodimethyl silan vapor was sucked through the vessel. By partially closing the needle valve a pressure of 0.2 mm. Hg was adjusted in the vessel. The glow discharge begun at a voltage drop of slightly over 1000 volts. Then during 5 minutes a current of 1 ma. at 100 volts from the anode to the cathode was adjusted. There was in the electrical circuit a resistance of 10,000 ohms. The voltage source was switched off, the needle valve and the valve of the nitrogen container closed and the vessel flooded by air. The diodes were annealed 15 minutes at 150° C. in air. They exhibited a blocking voltage over 1600 volts. A storage of two weeks without further protection in air at 150° C. did not deteriorate the characteristics.

What is claimed is:

1. A method for coating the surface of a semiconductor element with a protective film comprising the steps of:

(a) placing an etched semiconductor element onto a silicon containing cathode of a discharge vessel having opposed electrodes;

(b) evacuating the interior of the discharge vessel, while introducing therein an atmosphere containing a mixture of a carrier gas and a silicon compound;

(c) adjusting the pressure of said atmosphere to between about 0.1 and 2 torr;

(d) applying a direct current voltage of between about 400 and 1500 volts across said electrodes for igniting the discharge of the gaseous mixture in the vessel, thereby depositing a protective film consisting of a silicon compound.

2. The method defined in claim 1 wherein the carrier gas is oxygen.

3. The method defined in claim 1 wherein said silicon compound and said carrier gas are mixed by passing the carrier gas over the silicon compound in liquid form.

4. The method defined in claim 1 wherein the silicon compound is at least one selected from the group consisting of silanes, silanols, siloxanes and silicic acid esters.

5. The method defined in claim 1 wherein the silicon compound includes at least one organic silicon compound.

6. The method defined in claim 1 wherein the silicon compound includes at least one organic silicon compound selected from the group consisting of halogen substituted alkyl silanes, aryl silanes, alkyl aryl silanes and alkyl and aryl esters of silicic acid.

7. The method defined in claim 1 wherein the silicon compound includes at least one organic silicon compound selected from the group consisting of monochlorotrimethyl silane, dichlorodimethyl silane, trichloromethyl silane and silicic acid ethyl ester.

8. The method defined in claim 1 wherein said film has a thickness of between several 100 to several 1000 A.

9. The method defined in claim 1, comprising the further step, carried out subsequent to said film applying step, of heating the element.

10. The method defined in claim 9 wherein the element is heated at a temperature of about 150° C for approximately 10 minutes 11. The method defined in claim 9 wherein the element is heated in nitrogen at a temperature of about 270° C. for approximately 15 minutes.

12. The method defined in claim 1 wherein the carrier gas is nitrogen.

References Cited

UNITED STATES PATENTS

| | | | |
|---|---|---|---|
| 3,108,900 | 10/1963 | Papp | 117—93.1 |
| 3,239,368 | 3/1966 | Goodman | 117—93.1 |
| 3,337,438 | 8/1967 | Gobeli et al. | 204—164 |

WILLIAM L. JARVIS, Primary Examiner

U.S. Cl. X.R.

117—93.1, 106; 118—49.1; 204—164, 192